UNITED STATES PATENT OFFICE.

CALVIN B. LAKE, OF INDIANOLA, IOWA.

IMPROVEMENT IN REMEDIES FOR HOG-CHOLERA.

Specification forming part of Letters Patent No. 178,935, dated June 20, 1876; application filed May 3, 1876.

*To all whom it may concern:*

Be it known that I, CALVIN B. LAKE, of Indianola, in the county of Warren and State of Iowa, have invented certain new and useful Improvements in Hog-Cholera Medicine; and I do hereby declare the following to be a full, clear, and exact description of the invention, such as will enable others skilled in the art to which it pertains to make and use it.

My invention relates to an improvement in medicine for the prevention and cure of what is commonly known as "hog-cholera," but which I have, after repeated examinations and careful observation, found to be a specific blood-poison, and not a disease of the bowels, primarily, as its name would imply; and it consists in the use of certain ingredients, which will be more fully described hereinafter, whereby a compound is produced which will act directly upon the blood of the animal by entering the circulation with its drink, thereby neutralizing that septic principle which produces hog cholera, and thus prevent or remove all those conditions which result in cough, sore-throat, softening of the lungs, inflammation of the kidneys, abscess of the liver, diarrhea, &c.

To make a pint of the compound I take one ounce pulverized capsicum; four ounces muriate of ammonia; add hot water to make twelve fluid ounces, and to this add four ounces of tincture muriate of iron. Bottle and cork tight.

The medicine may be given in warm or cold water, in the proportion of an ounce to a pint or more of water, or in bran and water, or house-slop. No milk or acids of any kinds should be used with it, or alkalies, alkaline earths, or alkaline carbonates.

The dose is from half a table-spoonful to a table-spoonful to a large hog, two or three times a day, till the disease is well under control, and after that two or three times a week till the hog is well. The dose for smaller hogs is from half a tea-spoonful to half a table-spoonful, according to the age and size. As a preventive, give the same dose once a week. The medicine should always be continued till the secretions from the liver, kidneys, and bowels are healthy and regular.

What I claim is—

A medicine for the cure of hog-cholera, composed of capsicum, muriate of ammonia, water, tincture muriate of iron, in or about the proportions specified.

In testimony that I claim the foregoing I have hereunto set my hand this 27th day of April, 1876.

CALVIN B. LAKE.

Witnesses:
  TURNER HARBISON,
  JOHN W. JACKSON.